(12) United States Patent
Heath (10) Patent No.: US 8,800,938 B2
(45) Date of Patent: Aug. 12, 2014

(54) PIPE-TO-PIPE BRACE ASSEMBLY

(75) Inventor: Richard W. Heath, Yorba Linda, CA (US)

(73) Assignee: Cooper B-Line, Inc., Houston, TX (US)

( * ) Notice: Subject to any disclaimer, the term of this patent is extended or adjusted under 35 U.S.C. 154(b) by 135 days.

(21) Appl. No.: 13/239,170

(22) Filed: Sep. 21, 2011

(65) Prior Publication Data

US 2013/0068900 A1 Mar. 21, 2013

(51) Int. Cl.
*F16L 3/22* (2006.01)
*E04G 7/18* (2006.01)
*F16L 3/00* (2006.01)

(52) U.S. Cl.
USPC .......... 248/68.1; 248/74.1; 248/74.4; 248/49; 248/65; 248/73; 248/228.1; 285/61; 52/126.7; 52/127.2; 403/398; 403/399; 403/400; 403/385; 403/392; 403/346; 403/395; 24/300; 138/106; 138/107

(58) Field of Classification Search
USPC .............. 248/70, 68.1, 74.1, 74.4, 72, 49, 65; 248/67.7, 73, 228.1; 29/428; 285/61; 52/126.2, 126.7, 127.2, 702, 703; 403/398–400, 385, 392, 346, 395; 24/300; 138/106–107
See application file for complete search history.

(56) References Cited

U.S. PATENT DOCUMENTS

| | | | | |
|---|---|---|---|---|
| 2,511,035 A | * | 6/1950 | Barton | 403/385 |
| 2,749,068 A | * | 6/1956 | Wayman | 248/72 |
| 2,847,237 A | * | 8/1958 | Ackerman | 403/218 |
| 3,445,081 A | * | 5/1969 | Roussos | 248/72 |
| 3,888,446 A | * | 6/1975 | O'Brien et al. | 362/431 |
| 5,651,633 A | * | 7/1997 | Howe | 403/392 |
| 8,070,113 B1 | * | 12/2011 | Kirschner | 248/65 |
| 2005/0263650 A1 | * | 12/2005 | Kim et al. | 248/68.1 |

FOREIGN PATENT DOCUMENTS

| | | |
|---|---|---|
| EP | 1921362 | 5/2008 |
| EP | 2251553 | 11/2010 |
| FR | 2328127 | 5/1977 |

OTHER PUBLICATIONS

PCT/US2012/056623; filed Sep. 21, 2011; Cooper B-Line, Inc.; international search report dated Dec. 10, 2012.

* cited by examiner

*Primary Examiner* — Terrell McKinnon
*Assistant Examiner* — Christopher Garft
(74) *Attorney, Agent, or Firm* — Thorpe North & Western LLP (57) ABSTRACT

A pipe brace assembly includes a main clamp body that can be secured to a brace pipe. A cable, or other flexible tensioning member, can be wrapped around a braced pipe and secured to the main clamp body. The pipe brace assembly includes a method or mechanism for tensioning the cable or flexible tensioning member around the braced pipe. In some embodiments, the tensioning method or mechanism involves moving, such as rotating, the main clamp body to tension the cable or tensioning member. The clamping of the main clamp body and tensioning of the cable or tensioning member can occur simultaneously.

17 Claims, 4 Drawing Sheets

PIPE-TO-PIPE BRACE ASSEMBLY

BACKGROUND OF THE INVENTION

1. Field of the Invention

The present invention generally relates to pipe bracing assemblies. In particular, the present invention relates to a pipe-to-pipe bracing assembly.

2. Description of the Related Art

There is a multitude of products in the market utilized by building and plumbing contractors for bracing and supporting pipes, ducts, sprinkler systems, fans, air-conditioners and other loads below floors and ceilings. These products include clamps, braces, hooks, straps, plates, brackets, among other items. One type of arrangement utilizes a brace or bracing pipe that is attached to a beam, or other overhead support structure, by a suitable beam clamp. The brace pipe is used to support or brace another pipe, referred to as a braced or service pipe. A complicating factor in a pipe-to-pipe brace assembly is the variety of possible brace pipe and braced pipe sizes. In addition, most pipes or other loads require bracing at multiple locations along a length of the pipe or load. Prior art bracing assemblies often require specific hardware for each size of brace pipe and/or braced pipe. Furthermore, prior art bracing assemblies are time-consuming to install. Therefore, considering that each pipe, conduit, duct or other load within a building typically needs to be braced at multiple locations, significant cost reductions can be realized with a reduction in installation time.

SUMMARY OF THE INVENTION

Therefore, a need exists for a brace assembly that reduces the time for installation relative to the prior art assemblies. In addition, preferably, a single brace assembly can be used to support pipes or loads of various sizes without the need for size-specific components. In some arrangements, the brace assembly can accept multiple brace pipe sizes. At least some of the preferred embodiments include a main clamp body that can be secured to a brace pipe. A cable, or other flexible tensioning member, can be wrapped around the braced pipe and secured to the main clamp body. Preferably, a method or mechanism for tensioning the cable or tensioning member around the braced pipe is provided. In some arrangements, the tensioning method or mechanism involves moving (e.g., rotating) the main clamp body to tension the cable or tensioning member.

A preferred embodiment involves a brace assembly for bracing a braced pipe relative to a brace pipe. The brace assembly includes a cable and a main body. The main body includes an annular portion defining an opening that receives the brace pipe. A cable stop supports a first portion of the cable. A pipe support surface supports the braced pipe. A cable anchor can fix a second portion of the cable relative to the main body such that the cable can be placed in tension between the first and second portions. A cable tensioning arrangement is configured to move the cable stop relative to the cable anchor to tension the cable around the braced pipe and secure the braced pipe against the pipe support surface.

In some arrangements, the cable stop can be on a first side of the annular portion and the cable anchor is on a second side of the annular portion opposite the first side. The pipe support surface can be on the second side of the annular portion. The pipe support surface can be rounded and define a radius about a pipe support surface axis that is parallel to the braced pipe. The cable stop can comprise a hook structure. The hook structure and the main body can be formed from a single piece of material.

The cable anchor can comprise a bolt passing through an opening in the main body, the bolt having a pair of slots passing in a radial direction through a shaft portion of the bolt, wherein an end portion of the cable is passed through each of the slots and the cable is fixed to the main body by a head portion of the bolt and a nut threaded to the shaft of the bolt.

The cable tensioning arrangement can include a set screw that engages a threaded opening of the main body, wherein the threaded opening extends in a radial direction relative to the brace pipe, wherein an end of the set screw engages the brace pipe and the set screw can be tightened to rotate the main body about an axis perpendicular to the brace pipe such that the cable is tensioned.

A preferred embodiment involves a brace assembly for bracing a braced pipe relative to a brace pipe. The brace assembly includes a cable having a first end, a second end and an intermediate portion between the first and second ends. A main body includes an annular portion defining an opening that receives the brace pipe extending along a pipe axis through the opening. A cable stop supports the intermediate portion of the cable. The cable stop is located on a first side of the pipe axis. A pipe support surface supports the braced pipe. The pipe support surface is located on a second side of the pipe axis opposite the first side. A cable anchor includes a fastener, having a shaft portion and a head portion, and a nut that threadably engages the shaft portion of the fastener. The fastener is received by a fastener passage of the main body. The head portion secures the first end of the cable against the main body and the nut secures the second end of the cable against the main body. A tensioning screw has a threaded shaft portion and is received by a threaded tensioning passage of the main body. The tensioning passage extends in a substantially radial direction relative to the pipe axis and is offset from the annular portion of the main body. The tensioning screw is advanced into the tensioning passage to rotate the main body about an adjustment axis that is substantially perpendicular to both an axis of the tensioning passage and the pipe axis thereby tensioning the intermediate portion of the cable. The advancement of the tensioning screw also secures the main body to the brace pipe.

The cable anchor can be located on the second side of the pipe axis. The pipe support surface can be rounded and define a radius about a pipe support surface axis that is parallel to the braced pipe. The cable stop can comprise a hook structure. The hook structure and the main body can be formed from a single piece of material. The fastener of the cable anchor can comprise a pair of slotted openings passing in a radial direction through a shaft portion of the fastener, wherein each one of the pair of slotted openings receives a respective one of the first and second ends of the cable.

The opening of the annular portion can be configured to receive a brace pipe having a first diameter. The main body can further comprise a pair of threaded adjustment openings extending in a radial direction relative to the opening. The brace assembly can further comprise a pair of set screws that engage the pair of threaded adjustment openings and can be extended into the opening to effectively reduce the size of the opening such that the brace assembly can operate with a brace pipe having a second diameter less than the first diameter.

The cable can be a pre-stretched galvanized cable. The pipe support surface can extend at least about one inch in a direction along an axis of the braced pipe.

A preferred embodiment involves a method of bracing a braced pipe to a brace pipe, including looping a cable around the braced pipe. A first portion of the cable is secured to a clamp body. A second portion of the cable is secured to the clamp body with the braced pipe between an intermediate portion of the cable and the clamp body. The brace pipe is engaged by the clamp body. The clamp body is moved relative to the brace pipe to tension the intermediate portion of the cable.

The moving of the clamp body can comprise rotating the clamp body relative to an axis extending perpendicular to the brace pipe. The securing of the clamp body to the brace pipe can occur simultaneously with the moving of the clamp body.

For purposes of summarizing the invention and the advantages achieved over the prior art, certain objects and advantages of the invention have been described herein above. Of course, it is to be understood that not necessarily all such objects and advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects and advantages of the present brace assembly are described below with reference to drawings of preferred embodiments, which are intended to illustrate, but not to limit, the present invention. The drawings contain six (6) figures.

DETAILED DESCRIPTION OF THE PREFERRED EMBODIMENTS

A preferred pipe brace assembly is described herein with reference to FIGS. 1-5. The brace assembly may be described with reference to the orientation(s) shown in the various drawings. Relative or descriptive terms, such as "top," "bottom," "side" and the like are merely used to provide a frame of reference for this written description. The structures described herein can be mounted in any particular orientation and, therefore, the usage of these terms should not be considered limiting in any manner. Other relative or directional terms may be used herein. These terms are used in the context of the particular orientation(s) shown and should not be considered as limiting the structures to the illustrated orientation in actual use.

Figure 1:
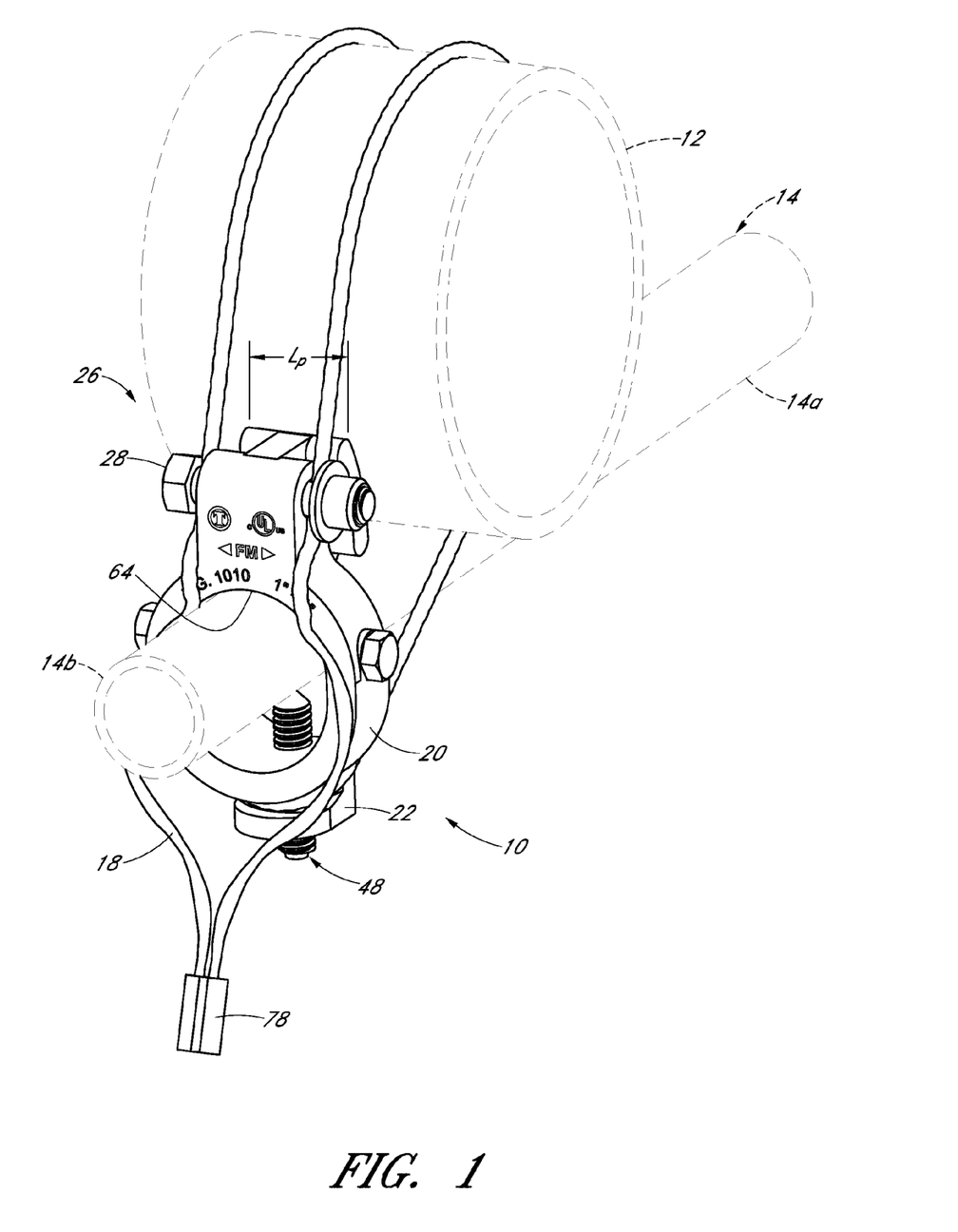
FIG. 1 is a perspective view of a pipe-to-pipe brace assembly having certain features, aspects and advantages of the present invention.
Figure 2:
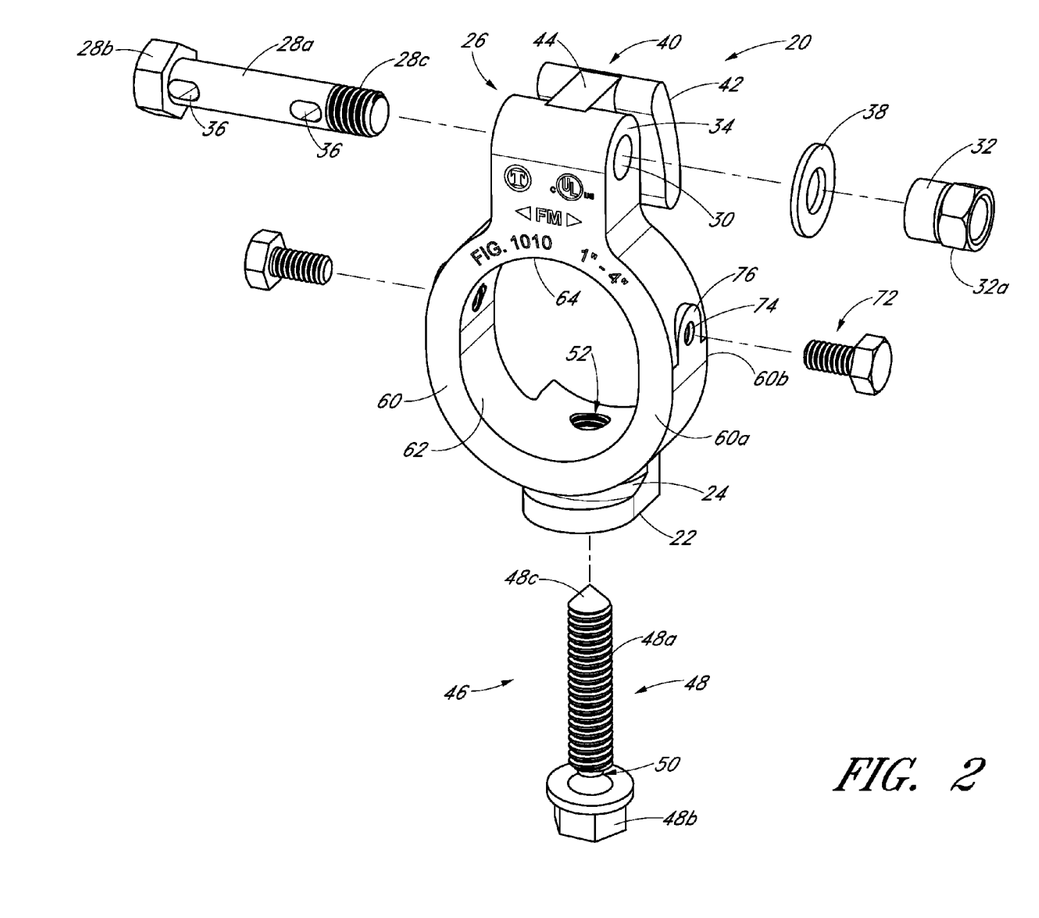
FIG. 2 is an exploded view of a main body and other components of the brace assembly of FIG. 1.
Figure 3:
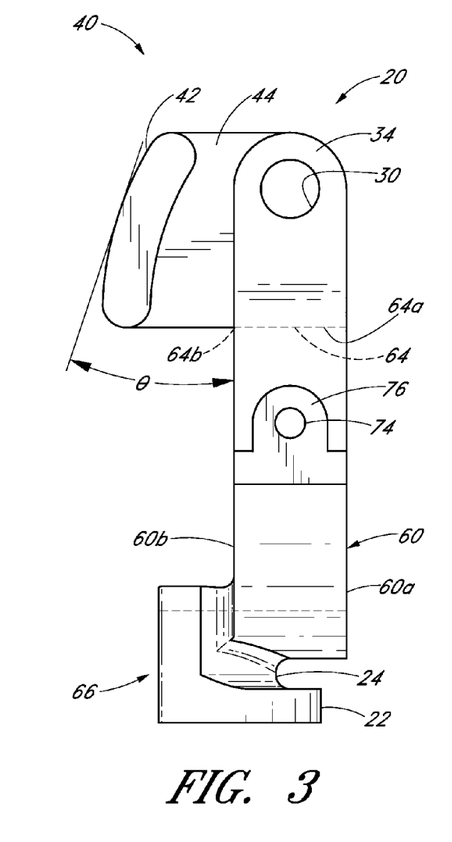
FIG. 3 is a side view of the main body of FIG. 2.
Figure 4:
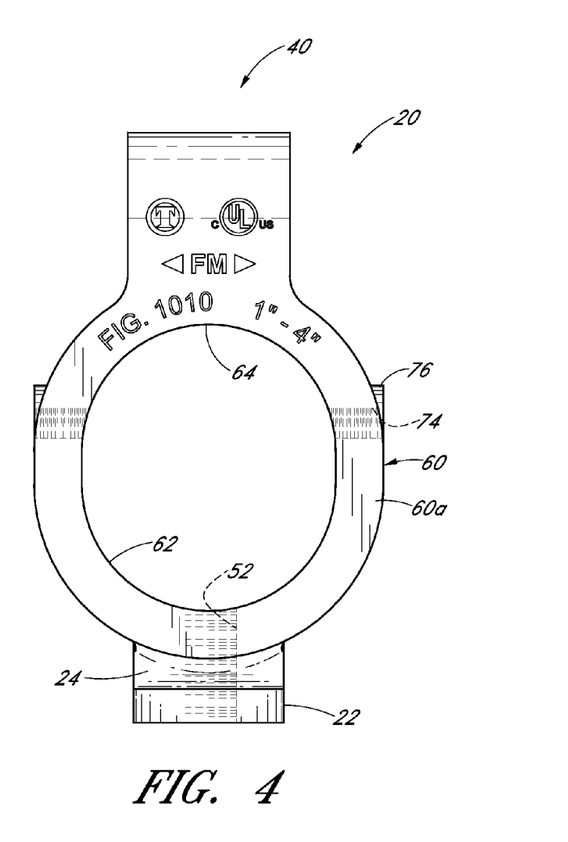
FIG. 4 is a front view of the main body of FIG. 2.
Figure 5:
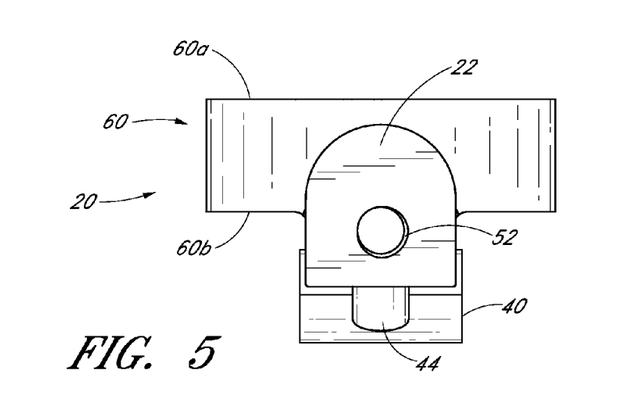
FIG. 5 is a bottom view of the main body of FIG. 2.

FIG. 1 illustrates a pipe brace assembly or pipe clamp assembly 10 utilized to support or brace a load, such as a pipe 12, relative to another pipe 14, which can be a brace pipe. The brace pipe 14 is attached at a supported end 14a to a suitable support structure, such as a beam or ceiling (not shown). Preferably, the braced pipe 12 and the brace pipe 14 are oriented approximately perpendicular to one another. In the illustrated arrangement, the brace pipe 14 extends below the braced pipe 12. However, other arrangements are also possible, for example, wherein the brace pipe 14 extends above the braced pipe 12. Preferably, a free end 14b of the brace pipe 14 extends past the braced pipe 12 a distance sufficient to accommodate the pipe brace assembly 10 at a location inset from the free end 14b of the brace pipe 14. The dimension of the inset may vary by application or local code; however, in one arrangement, a preferred inset is at least one inch.

The pipe brace assembly 10 secures the braced pipe 12 and brace pipe 14 to one another. The illustrated pipe brace assembly 10 includes a cable 18 and a main clamp body or main body 20. The main body 20 can be secured to the brace pipe 14 and the cable 18 can be looped or wrapped around the braced pipe 12 and attached to the main body 20. As described below, the cable 18 and/or the main body 20 can be manipulated to tension the cable 18 around the braced pipe 12.

Preferably, the pipe brace assembly 10 includes a cable stop 22 that can be utilized to support a portion of the cable 18, such as an intermediate portion of the cable 18. In the illustrated arrangement, the cable stop 22 is defined by the main body 20. That is, preferably, the cable stop 22 and main body 20 are a monolithic structure, or are constructed from a single piece of material. However, in other arrangements, the cable stop 22 can be separate from the main body 20 and/or can be attached to the main body 20. The illustrated cable stop 22 is in the form of a hook that cooperates with another portion of the main body 20 to define a slot or groove 24 that receives the cable 18.

The pipe brace assembly 10 preferably also includes a cable anchor 26 that is capable of securing a portion of the cable 18 relative to the pipe brace assembly 10. In the illustrated arrangement, the cable anchor 26 secures a portion of the cable 18 to the main body 20 such that the cable 18 can be tensioned between the cable stop 22 and the cable anchor 26. Preferably, the cable anchor 26 includes a fastener 28 that passes through a cooperating opening 30 (FIG. 2) of the main body 20. The fastener 28 has a shaft portion 28a, a head portion 28b and a threaded end portion 28c. A nut 32 engages the threaded end portion 28c. The head portion 28b and/or the nut 32 can be utilized to clamp a portion of the cable 18 against a surface 34 of the main body 20 adjacent to or surrounding the opening 30. Preferably, as described below and shown in FIG. 1, both the head portion 28b and the nut 32 are used to clamp the cable 18 to the main body 20. In the illustrated arrangement, the fastener 28 includes a pair of slots 36 passing in a radial direction through the shaft portion 28a. The slots 36 are sized to allow the cable 18 to pass through the slots 36. Preferably, the slots 36 are at least somewhat elongated in an axial direction of the shaft portion 28a to allow the cable 18 to move in the axial direction within the slots 36. Thus, a portion of the cable 18 extends through each of the slots 36 and clamped between the head portion 28b or the nut 32 and the surface 34 of the main body 20. Alternatively, the slots 36 can be omitted and the cable 18 can pass beside the shaft portion 28a. An optional washer 38 can be interposed between the nut 32 and the cable 18 to provide additional surface area clamping the cable 18 and to prevent the nut 32 from acting directly against the cable 18 as it is being rotated relative to the fastener 28 to clamp the cable 18 against the main body 20. The nut 32 can be of a "torque-off" design such that a tool engagement portion 32a is configured to separate from the remainder of the nut 32 once a suitable torque level is reached. Such an arrangement allows simple verification that the nut 32 has been tightened to an appropriate torque level.

Preferably, the main body 20 includes a pipe support portion 40 that defines a pipe support surface 42. The pipe support surface 42 is located relative to the main body 20 to provide a surface for the braced pipe 12 to rest against when braced by the tensioned cable 18. In the illustrated arrangement, the pipe support portion 40 is located on an opposite side of the main body 20 from the cable stop 22 relative to the brace pipe 14. That is, in the illustrated arrangement, the cable stop 22 is generally below the brace pipe 14 and the pipe support portion 40 is generally above the brace pipe 14. Preferably, the cable anchor 26 is located on the same side of the main body 20 (above the brace pipe 14, in the illustrated arrangement) as the pipe support portion 40.

Preferably, the pipe support portion 40 is elongated in a direction substantially parallel to an axis of the braced pipe 12 and substantially perpendicular to an axis of the brace pipe 14. The pipe support surface 42 defines a minimum linear dimension or length $L_p$ in the direction substantially parallel to the axis of the braced pipe 12. Preferably, the minimum dimension of the length $L_P$ is selected such that the pipe support surface 42 provides a sufficient contact area with the braced pipe 12 to spread the load applied by the cable 18 and avoid significant denting or deformation of the braced pipe 12 when the cable 18 is tensioned. The desired minimum dimension of the length $L_P$ can vary depending on the particular application, such as the type, material or wall thickness of the intended braced pipe 12. The maximum dimension of the length $L_P$ can be selected as desired to address relevant factors such as avoiding interference with the cable 18 or cable anchor 26, avoiding excess material costs or other practical considerations.

In some arrangements, the pipe support surface 42 is curved about at least one axis and, preferably, curved about an axis extending in a lateral direction relative to the main body 20, or substantially parallel to the axis of the braced pipe 12. As described below, in some arrangements, the main body 20 is rotated about a rotation axis such that the pipe support surface 42 moves or slides relative to an outer surface of the braced pipe 12. The curved shape of the pipe support surface 42 facilitates movement of the pipe support portion 40 relative to the braced pipe 12 without damaging the braced pipe 12. In addition, the curved shape allows the pipe support portion 40 to provide appropriate support for a variety of braced pipe sizes or diameters.

The pipe support surface 42 can be generally tilted, canted or angled relative to the main body 20. Preferably, an upper portion of the pipe support surface 42 is offset from a lower portion of the pipe support surface 42 in a direction of the axis of the brace pipe 14. In the illustrated arrangement, the upper portion of the pipe support surface 42 is relatively closer to the main body 20 and the lower portion of the pipe support surface 42 is relatively further from the main body 20. However, in other arrangements, this orientation could be reversed. An angle Θ of the cant or tilt of the pipe support surface 42 relative to the main body 20, or an axis perpendicular to both the axis of the brace pipe 14 and the axis of the braced pipe 12, can be measured directly in the case of a planar or substantially planar surface shape or by measuring a plane that is tangent to the surface in the case of the illustrated curved surface shape. In the illustrated arrangement, a web 44 supports the pipe support portion 40 relative to the remainder of the main body 20. The web 44 is narrower in a lateral direction than the pipe support portion 40. However, in other arrangements, the pipe support portion 40 can be directly supported by the remainder of the main body 20 and the web 44 can be omitted.

Preferably, the pipe brace assembly 10 also includes a clamp arrangement 46 that can secure the main body 20 to a desired location on the brace pipe 14. The clamp arrangement 46 can be constructed of any suitable arrangement, such as one or more fasteners, cam mechanisms, clamp devices, band clamps, or any combination these or any other suitable devices or arrangements. In the illustrated pipe brace assembly 10, the clamp arrangement 46 includes at least one fastener, which, preferably, is a single threaded fastener 48. Preferably, the fastener 48 has a threaded shaft portion 48a, a head portion 48b and an end portion 48c. The head portion 48b can be a break-away or torque-off head that is designed to separate from the shaft portion 48a at a certain torque level. A reduced-diameter neck 50 can be provided between the head portion 48b and the shaft portion 48a to facilitate the desired separation between the head portion 48b and the shaft portion 48a. The end portion 48c can be of any suitable construction, such as a flat end, cup-point or the illustrated cone-point. The cone-point shape can cause the end portion 48c to penetrate the outer surface of the brace pipe 14 to create an interference engagement between the fastener 48 and the brace pipe 14 and increase the clamping force of the main clamp body 20 on the brace pipe 14.

The fastener 48 engages a threaded opening 52 in the main body 20. Preferably, the threaded opening 52 extends through the main body 20 in a radial direction relative to the axis of the brace pipe 14. In the illustrated arrangement, the threaded opening 52 is located on the same side of the main body 20 as the cable stop 22. That is, preferably, the threaded opening 52 passes through a lower portion of the main body 20.

Preferably, the main body 20 includes an annular portion 60 that defines an opening 62. In a preferred arrangement, the opening 62 is oblong in the vertical direction, as illustrated, or in a direction generally extending between the cable stop 22 and cable anchor 26 or between the clamp arrangement 46 and the pipe support 40. The annular portion defines a first surface 60a opposite the pipe support portion 40 and a second surface 60b on the same side of the main body 10 as the pipe support portion 40. A section of the annular portion 60 opposite the threaded opening 52 defines a contact surface portion 64 that contacts the brace pipe 14 when the main body 20 is secured or clamped to the brace pipe 14. The contact surface portion 64 extends between a first end 64a and a second end 64b defined by the annular portion 60 of the main body 20. Preferably, the threaded opening 52 is offset from at least one of the first end 64a and the second end 64b of the contact surface portion 64 in a direction parallel to the axis of the brace pipe 14. In the illustrated arrangement, the threaded opening 52 is offset from both the first end 64a and second end 64b of the contact surface portion 64. Preferably, the axis of the threaded opening 52 is offset from the entire contact surface portion 64.

In the illustrated arrangement, the threaded opening 52 is located in a projecting portion 66 of the main body 20 that projects from the annular portion 60 in a direction parallel to the axis of the brace pipe 14. Preferably, the projecting portion 66 projects in the same direction from the main body 20 as the pipe support portion 40 and is on the opposite side of the axis of the brace pipe 14 from the pipe support portion 40 and/or the cable anchor 26. That is, preferably, the projecting portion 66 is located on a lower portion of the main body 20. The threaded opening 52 preferably is at least partially located within the projecting portion 66. Preferably, as described above, the axis of the threaded opening 52 is located within the projecting portion 66. The projecting portion 66 preferably also defines a portion of the cable stop 22. As apparent in FIGS. 3 and 5, an end surface of the hook shape of the cable stop 22 can be located behind the surface 60a of the annular portion 60.

Preferably, the pipe brace assembly 10 also includes a brace pipe size adjustment arrangement 70 that permits adjustment of a size of the brace pipe 14 that can be used with the assembly 10. In the illustrated arrangement, the brace pipe size adjustment arrangement 70 can permit the pipe brace assembly 10 to be varied between two different sizes of brace pipe 14. The illustrated brace pipe size adjustment arrangement 70 includes a pair of threaded fasteners or centering bolts 72 that can be threadably engaged with threaded openings 74 that extend in a lateral direction through the main body 20 and open into the opening 62. The fasteners 72 can be threaded into the threaded openings 74 such that a portion of the fasteners 72 extend into the opening 62 of the main body 20. When so positioned, the end portions of the fasteners 72 effectively reduce a diameter of the opening 62 such that the pipe brace assembly 10 can be used with a brace pipe 14 having a first size or diameter. The fasteners 72 will center the brace pipe 14 in a lateral direction within the opening 62. The fasteners 72 can also be retracted or removed from the threaded openings 74 such that the end portions of the fasteners 72 are no longer present within the opening 62. In this orientation, the pipe brace assembly 10 can be used with a brace pipe 14 having a second size or diameter. For example, the pipe brace assembly 10 can be configured to clamp to a one inch (1") or a one and one-quarter inch (1¼") brace pipe 14. The main body 20 can include bosses 76 that surround the threaded openings 74 and can provide contact (e.g. flat) surfaces for head portions of the fasteners 72.

The main body 20 can be constructed of any suitable materials, such as metals, plastics or composites, by any suitable processes, such as forging, casting, molding, stamping or machining. In one arrangement, the main body 20 is cast from a ductile iron material. Although the main body 20 is illustrated as a single piece, it is also possible to construct the main body 20 from an assembly of separate pieces. For example, the annular portion 60 could be constructed from one or more pieces of material that are separate from one or more pieces of material defining the cable anchor 26, cable stop 22 and pipe support 40. In one arrangement, the main body 20 can have dimensions of about 3.934 inches in overall height and about 2.326 inches in width. The opening 62 can have a vertical (as illustrated) dimension of about 1.91 inches and a lateral or horizontal dimension of about 1.69 inches. A wall thickness of the annular portion 60 can be about 0.318 inches. The groove or slot 24 can have a height dimension of about 0.202 inches. One or both of the opening 30 and the pipe support surface 42 can have a lateral dimension ($L_P$ in the case of the pipe support surface 42) of about 1.080 inches. The angle $\Theta$ of the pipe support surface can be between about 15-20 degrees or about 18.49 or 18.5 degrees. A main body 20 having these dimensions is well-suited for the intended application of a 1 or 1¼ inch brace pipe 14 and about a 1-4 inch braced pipe 12. However, other dimensions may be used to facilitate use in other applications.

The cable 18 preferably is a pre-stretched, galvanized aircraft grade cable. The cable 18 can be a multifilament or monofilament cable. Moreover, other suitable elongate members that can be placed in tension can also be used, such as composite fibers, for example. Preferably, the cable 18 is flexible along a part or all of its length such that it can conform to the size and/or shape of the braced pipe 12. The cable 18 can have a generally round cross-section or could have a flat or rectangular cross-section, such as a strap. Thus, the term cable is intended to be a broad term given its ordinary meaning and encompassing all of the above-described embodiments and other suitable arrangements.

In the illustrated arrangement, an intermediate portion of the cable 18 engages the hook of the cable stop 22. Preferably, a center portion of the cable 18 engages the cable stop 22. The cable 18 passes on each side of the brace pipe 14 and loop around the braced pipe 12. Each end of the cable 18 is passed through one of the slots 36 of the fastener 28 on opposing sides of the main body 20. The ends of the cable 18 can be secured together, such as by a cable end or ferrule 78. Portions of the cable 18 are secured relative to the main body 20 by the cable anchor 26. Thus, preferably, a section of the cable 18 extends from the cable stop 22 to the cable anchor 26 and another section of the cable 18 extends from the cable stop 22 to the cable anchor 26. In the illustrated arrangement, the sections of the cable 18 are portions of a single cable. Such an arrangement is advantageous in that the full strength of the cable can be utilized, unlike arrangements in which cable ends or connectors are used in portions of the cable that is in tension. However, such cables and cable portions can be used in certain applications. In other arrangements, multiple cable portions can be used, for example with ends at each of the cable stop 22 and the cable anchor 26. Moreover, in some applications, a single cable may be used that extends between the cable stop 22 and the cable anchor 26. Thus, the cable stop 22 may also be in the form of a cable anchor configured to pinch clamp or otherwise secure the cable relative to the main body 20.

To install the pipe brace assembly 10, preferably, the cable 18 is pre-installed with each end portion passed through the fastener 28 of the cable anchor 26 and the cable ends secured together with the cable end 78. However, preferably, the cable anchor 26 is not tightened and the cable 18 is movable relative to the main body 20. The cable 18 can be looped or wrapped around the braced pipe 12 and then looped around the hook of the cable stop 22 and engaged with the groove 24. The centering fasteners 72 can be removed or installed depending on the size of brace pipe 14 used. The main body 20 can then be slid onto the free end 14b of the brace pipe 14 to a desired position from the free end 14b and, preferably, such that the pipe support surface 42 abuts the braced pipe 12. The end(s) of the cable 18 can be pulled to remove slack from the cable 18 and the nut 32 can be tightened on the fastener 28 such that the cable anchor 26 secures the cable 18 relative to the main body 20.

Figure 6A:
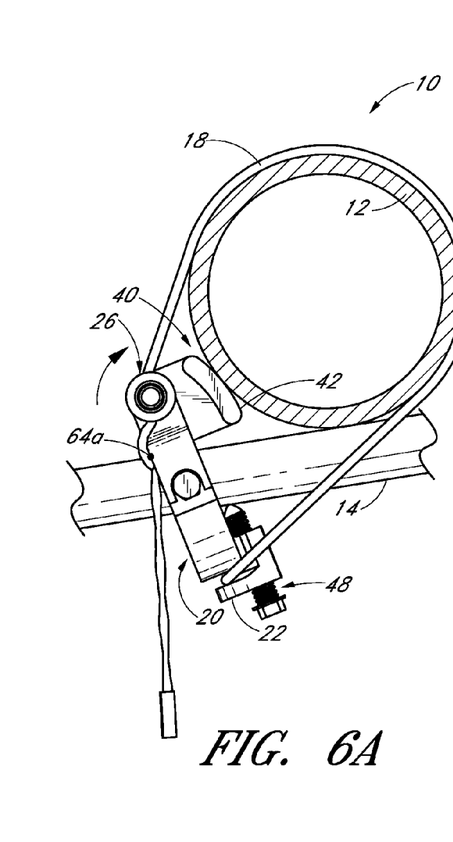
FIGS. 6A-C are views of the brace assembly of FIG. 1 in several orientations.

At this point, the main body 20 preferably is angled or canted relative to the brace pipe 14. For example, with reference to FIG. 6A, the main body 20 preferably rests on the brace pipe 14 with the contact surface 64 of the opening 62 and the end 48c of the fastener 48 in contact with the brace pipe 14. In some arrangements, the first end 64a of the contact surface 64 is in contact with the brace pipe 14. The fastener 48 can be tightened relative to the main body 20 such that the end 48c is moved further into the opening 62. As the fastener 48 is tightened, the main body 20 rotates relative to the brace pipe 14, preferably generally about an adjustment axis that is perpendicular to the axis of the brace pipe 14. The adjustment axis may pass through a point of contact between the brace pipe 14 and the surface 64 (e.g., surface portion 64a) of the main body 20 or through a point of contact between brace pipe 14 and the fastener 48 (e.g., the end 48c). Or, the adjustment axis may be positioned at some location in between the surface 64 and the end 48c of the fastener 48. That is, one or both of the surface 48 and the end 48c of the fastener 48 may move or slide relative to the brace pipe 14 during the rotation of the main body 20. Accordingly, the rotation of the main body 20 may not be precisely about any single point of contact between the pipe brace assembly 10 and the brace pipe 14.

Figure 6B:
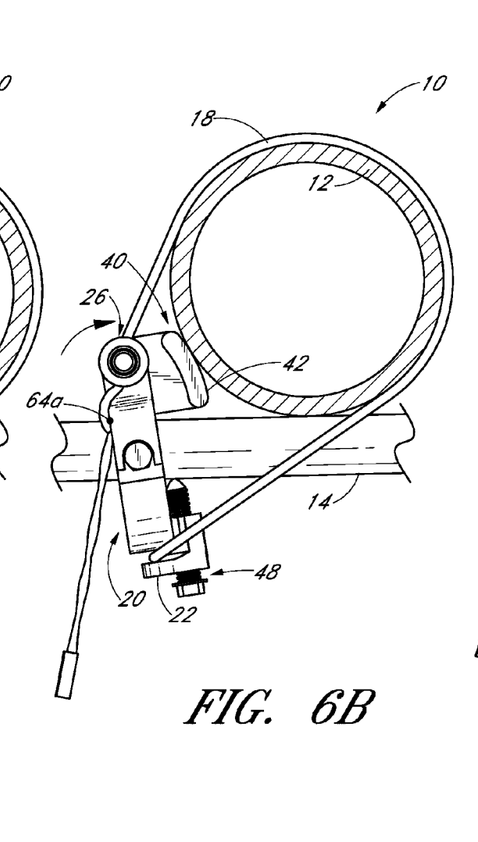
Figure 6C:
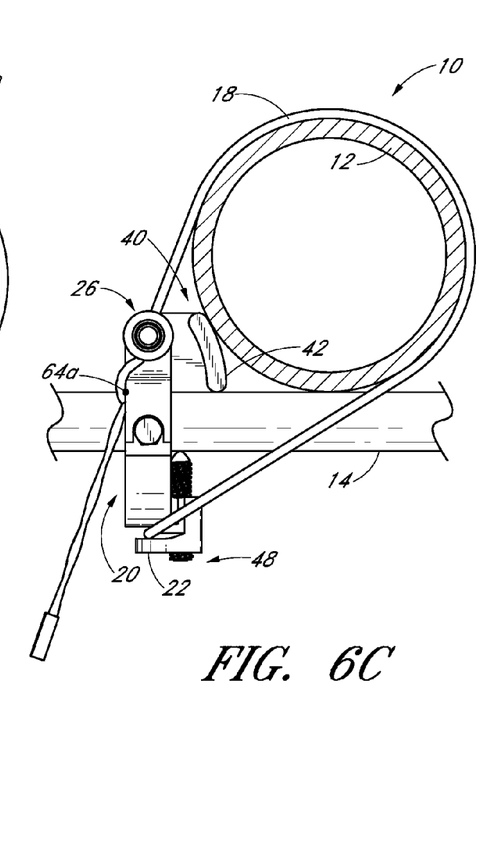

As illustrated in FIGS. 6B and 6C, the rotation of the main body 20 moves the cable stop 22 further away from the brace pipe 14 (e.g., down in FIGS. 6A-6C) and further away from the braced pipe 12. In addition, the cable anchor 26 moves toward the brace pipe 14 (e.g., down in FIGS. 6A-6C) and toward the brace pipe 12. The combined movement of the cable stop 22 and the cable anchor 26 operates to increase the tension of the cable 18 to secure the braced pipe 12 against the main body 20 and the brace pipe 14. That is, the movement of one or both of the cable stop 22 and the cable anchor 26 operates to increase the tension in the cable 18. However, in some instances, the movement of one of the cable stop 22 or the cable anchor 26 can be in a direction that tends to decrease the tension in the cable 18, so long as the movement of the other of the cable stop 22 and the cable anchor 26 is compensatory and results in an overall increase in the tension of the cable 18.

Advantageously, in the illustrated arrangement, the tightening of the fastener 48 acts to both secure or clamp the main body 20 to the brace pipe 14 and tension the cable 18. Thus, clamping of the main body 20 and tensioning of the cable 18 occurs simultaneously with the single action of tightening the fastener 48. Although the above-described arrangement is preferred for its simplicity, cost-effective manufacture and quick installation, other arrangements are possible in which the fastening of the main clamp body 20 to the brace pipe 14 and the tensioning of the cable 18 may or may not occur simultaneously. For example, the main body 20 can be clamped to the brace pipe 14 by one or more fasteners or other suitable clamping arrangements. The pipe brace assembly 10 can include one or more movable tensioning members or portions that can be moved to tension the cable 18. The clamping arrangement can carry or otherwise interact with the tensioning member such that clamping and tensioning occurs simultaneously through a single action. However, in other arrangements, the clamping and tensioning arrangements or mechanisms can be completely separate and the clamping and tensioning can be separate steps. Moreover, separate portions or ends of the cable 18 or other tensioning member can be secured to separate components of the pipe brace assembly 10, one or both of which can be moved to tension a portion of the cable 18/tensioning member between the secured portions/ends.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present pipe brace assembly has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A brace assembly for bracing a braced pipe relative to a brace pipe, comprising:
    a cable;
    a main body comprising an annular portion defining an opening that receives the brace pipe, a cable stop that supports a first portion of the cable, a pipe support surface that supports the braced pipe;
    a cable anchor that can fix a second portion of the cable relative to the main body such that the cable can be placed in tension between the first and second portions, wherein the cable anchor comprises a bolt passing through an opening in the main body, the bolt having a pair of slots passing in a radial direction through a shaft portion of the bolt, wherein an end portion of the cable is passed through each of the slots and the cable is fixed to the main body by a head portion of the bolt and a nut threaded to the shaft of the bolt;
    a cable tensioning arrangement configured to move the cable stop relative to the cable anchor to tension the cable around the braced pipe and secure the braced pipe against the pipe support surface.

2. The brace assembly of claim 1, wherein the cable stop is on a first side of the annular portion and the cable anchor is on a second side of the annular portion opposite the first side.

3. The brace assembly of claim 2, wherein the pipe support surface is on the second side of the annular portion.

4. The brace assembly of claim 1, wherein the cable stop comprises a hook structure.

5. The brace assembly of claim 4, wherein the hook structure and the main body are formed from a single piece of material.

6. The brace assembly of claim 1, wherein the cable tensioning arrangement comprises a fastener that engages a threaded opening of the main body, wherein the threaded opening extends in a radial direction relative to the opening of the main body, wherein an end of the fastener engages the brace pipe and the fastener can be tightened to rotate the main body about an axis perpendicular to the brace pipe such that the cable is tensioned.

7. The brace assembly of claim 1, wherein the pipe support surface is rounded and defines a radius about a pipe support surface axis that is parallel to the braced pipe.

8. A brace assembly for bracing a braced pipe relative to a brace pipe, comprising:
    a cable having a first portion, a second portion and an intermediate portion between the first and second ends;
    a main body comprising an annular portion defining an opening that receives the brace pipe extending along a pipe axis through the opening, a cable stop that supports the intermediate portion of the cable, the cable stop located on a first side of the pipe axis, a pipe support surface that supports the braced pipe, the pipe support surface located on a second side of the pipe axis opposite the first side;
    a cable anchor comprising a fastener, having a shaft portion and a head portion, and a nut that threadably engages the shaft portion of the fastener, wherein the fastener is received by a fastener passage of the main body and the head portion secures the first end of the cable against the main body and the nut secures the second end of the cable against the main body;
    a tensioning bolt having a threaded shaft portion, the tensioning bolt received by a threaded tensioning passage of the main body, wherein the tensioning passage extends in a substantially radial direction relative to the pipe axis and is offset from the annular portion of the main body, wherein the tensioning bolt is advanced into the tensioning passage to rotate the main body about an adjustment axis that is substantially perpendicular to both an axis of the tensioning passage and the pipe axis thereby tensioning the intermediate portion of the cable, wherein the advancement of the tensioning bolt also secures the main body to the brace pipe.

9. The brace assembly of claim 8, wherein the cable anchor is located on the second side of the pipe axis.

10. The brace assembly of claim 8, wherein the pipe support surface is rounded and defines a radius about a pipe support surface axis that is parallel to the braced pipe.

11. The brace assembly of claim 8, wherein the cable stop comprises a hook structure.

12. The brace assembly of claim 11, wherein the hook structure and the main body are formed from a single piece of material.

13. The brace assembly of claim 8, wherein the fastener of the cable anchor comprises a pair of slotted openings passing in a radial direction through a shaft portion of the fastener, wherein each one of the pair of slotted openings receives a respective one of the first and second portions of the cable.

14. The brace assembly of claim 8, wherein the opening of the annular portion is configured to receive a brace pipe having a first diameter, the main body further comprising a pair of threaded adjustment openings extending in a radial direction relative to the opening, the brace assembly further comprising a pair of set screws that engage the pair of threaded adjustment openings and can be extended into the opening to effectively reduce the size of the opening such that the brace assembly can operate with a brace pipe having a second diameter less than the first diameter.

15. The brace assembly of claim 8, wherein the cable is a pre-stretched galvanized cable.

16. The brace assembly of claim 8, wherein the pipe support surface extends at least about one inch in a direction along an axis of the braced pipe.

17. A brace assembly for bracing a braced pipe relative to a brace pipe, comprising:
  a cable;
  a main body comprising an annular portion defining an opening that receives the brace pipe, a cable stop that supports a first portion of the cable, a pipe support surface that supports the braced pipe;
  a cable anchor that can fix a second portion of the cable relative to the main body such that the cable can be placed in tension between the first and second portions;
  a cable tensioning arrangement configured to move the cable stop relative to the cable anchor to tension the cable around the braced pipe and secure the braced pipe against the pipe support surface, wherein the cable tensioning arrangement comprises a fastener that engages a threaded opening of the main body, wherein the threaded opening extends in a radial direction relative to the opening of the main body, wherein an end of the fastener engages the brace pipe and the fastener can be tightened to rotate the main body about an axis perpendicular to the brace pipe such that the cable is tensioned.

\* \* \* \* \*